(12) United States Patent
Maier et al.

(10) Patent No.: US 7,383,757 B2
(45) Date of Patent: Jun. 10, 2008

(54) METHOD AND DEVICE FOR CUTTING AND DEBURRING TUBES, PARTICULARLY PLASTIC AND CARDBOARD TUBES

(75) Inventors: Siegfried Maier, Metzingen (DE); Adolf Brodbeck, Metzingen (DE)

(73) Assignee: Adolf Brodbeck Maschinenbau GmbH & Co. KG, Metzingen (DE)

( * ) Notice: Subject to any disclaimer, the term of this patent is extended or adjusted under 35 U.S.C. 154(b) by 354 days.

(21) Appl. No.: 10/897,671

(22) Filed: Jul. 22, 2004

(65) Prior Publication Data
US 2005/0015965 A1 Jan. 27, 2005

(30) Foreign Application Priority Data
Jul. 25, 2003 (DE) ................. 103 34 373

(51) Int. Cl.
*B23G 3/00* (2006.01)
(52) U.S. Cl. .......................................... 82/1.11; 82/46

(58) Field of Classification Search ............... 82/113, 82/1.11, 46, 117, 173; 72/70; 29/33, 898
See application file for complete search history.

(56) References Cited

U.S. PATENT DOCUMENTS

| 3,183,702 | A | * | 5/1965 | Zittell | 72/294 |
| 3,563,119 | A | * | 2/1971 | Shashaty | 82/173 |
| 4,126,064 | A | * | 11/1978 | Tarrant | 82/1.11 |
| 4,953,377 | A | * | 9/1990 | Thorell | 72/70 |
| 6,009,735 | A | * | 1/2000 | Knotek | 72/70 |

* cited by examiner

*Primary Examiner*—Willmon Fridie

(57) ABSTRACT

The invention relates to a method and a device for cutting and deburring tubes, particularly plastic and cardboard tubes, in which in a clamp after the production of a cut edge on a starting tube and a tube piece, an inner and outer bevel are produced, a starting tube and a tube piece being moved back and forth relative to one another by a clamping device and a retaining device.

13 Claims, 8 Drawing Sheets

METHOD AND DEVICE FOR CUTTING AND DEBURRING TUBES, PARTICULARLY PLASTIC AND CARDBOARD TUBES

CROSS REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

FIELD OF THE INVENTION

The invention relates to a method and device for cutting and deburring tubes, particularly plastic and cardboard tubes.

From EP 0 338 015 there is known a method for cutting and deburring tubes. in which a starting tube is cut in succession into plural small tube pieces and subsequently deburred. A machine is provided for this purpose which has a cutting device and a deburring device, which are allocated to a cut place. A starting tube and a cut-off tube piece are respectively held by support jaws which engage on the outer periphery of the starting tube and of the tube piece. After a tube piece has been cut off, the tube piece is removed from the starting tube in the axial direction of the longitudinal axis of the starting tube, in order to position a deburring device between them. The cut-off tube piece is then pressed against the deburring device, which in its turn is pressed onto the cut end of the starting tube. The deburring device is actuated by a drive located externally, outside the tube piece and the starting tube.

This method has the disadvantage that, depending on the pressing pressure, the deburring of the inner and outer cut edge is dependent on the cut place. Moreover the device has the disadvantage that a large constructional space in the region of the cut place is required. Also a very costly construction is required in order to make possible the cutting and deburring of tube pieces in a clamping.

From DE-OS 20 15 795 there emerges a method and a device for cutting tubes and for chamfering the cut edges. A tool is used in this method comprising a combination of a cutting-off blade and the deburring tool. In order to perform the working steps in succession, it is required that the starting tube and the cut-off tube piece are respectively received by clamping devices provided separately from each other on a machine bed and arranged to be able to travel separately. This device has a constructionally very costly structure. Moreover, it is disadvantageous in this method that a special tool is required for each beveling or for each tube diameter in order to perform a cutting-off of a tube piece and a beveling of the cut edges of the starting tube and tube piece.

OBJECT OF THE INVENTION

The invention therefore has as its object to propose a method for cutting and deburring tubes, particularly plastic or cardboard tubes, in which a rapid working sequence is produced for producing the tube pieces with cut surfaces of high surface quality and beveled cut edges, and to provide a device which is easily manipulated and makes possible the rational production of tube pieces, even with small diameter.

This object is attained according to the invention.

The method according to the invention makes possible a rational manufacture for the production of tube pieces independently of a tube diameter and of wall thickness of tube to be machined. By the successive method steps, the production of beveled cut edges at the outer and inner peripheries of the tube pieces, and at least a fine processing of the cut edge located in the cut position, is made possible in one clamping. Particularly with cardboard or plastic tubes, a particularly high surface quality of the end faces on the tube pieces and also a bevel provided on the outer and inner periphery is desired, in order to facilitate the placing or setting of the tubes, for example on winding mandrels, and to improve the optical appearance.

According to an advantageous embodiment of the method, it is provided that the deburring tool for processing an outer cut edge is positioned in advance of, succeeding, or simultaneously with the cutting place. Process-optimized thereby, two processing steps can be performed following closely after one another, simultaneously, or partially overlapping. Preferably, the deburring tool is driven lagging a cutting tool, such as a cutting-off blade, so that the bevel on the outer cut edge can be ended simultaneously with the cutting process.

According to a further advantageous embodiment of the method, it is provided that after the deburring of the inner edge of the starting tube and of the tube piece, on advancing the deburring tool out of the interior of the starting tube and of the tube piece, the end faces of the starting tube and of the tube piece are processed. Preferably a smoothing process is performed in order to attain a high surface quality.

The processing of the end faces of the starting tube and of the tube piece are performed successively or simultaneously, according to a preferred embodiment. The simultaneous processing has the advantage that time-optimized manufacture is made possible. Depending on the material and the wall thickness of the starting tube, successive processing can be advantageous in order to keep the tool to a lower working temperature so that a high surface quality is attained.

According to a further advantageous embodiment of the process, it is provided that on cutting off a tube piece, the starting tube is set in rotation. The cutting and deburring tools can thereby be formed as non-rotating parts, giving a simple construction of the device.

According to a further advantageous embodiment of the process, it is provided that during deburring the cut place, and preferably during fine processing of the end faces, the starting tube and the tube piece are set in rotation. Simultaneously after forming the cut both the starting tube and the tube piece can be driven with the same peripheral speed, so that a uniform and unit production of the bevel and surface quality of the end face are produced at the cut place. Chip removal is facilitated and controllable, due to the non-rotating tools, giving a further advantage.

The process furthermore provides that at least during the cutting off of the tube piece at least a cooling and/or lubrication is provided at the cut place, or a coolant or lubricant is supplied. The cut places of the starting tube and the tube piece can thereby be formed with higher quality. Simultaneously, changes in the properties of the material in the region of the cut place due to heating during the cutting process are avoided.

The retaining device for receiving the pipe piece is advantageously set in rotation by a drive unit, which drives the starting tube. A simplification of the construction of the device is thereby attained and a uniform quality is obtained on processing the inner cut edges and the end faces.

According to a further advantageous embodiment of the method, it is provided that the retaining device is positioned coaxially of the clamping device by means of a bearing engaging on the outer periphery of the pipe piece. Thus a retaining device can be provided located within the starting tube and the tube piece, which makes possible, by means of the precise positioning of the cut-off tube piece to the starting tube, a simultaneous processing of the cut edge formed on the inner periphery and the mutually opposite end faces. The qualities of the cut places on the tube piece and on the starting tube are equal, so that a preferred end does not have to be considered upon further processing of the tube piece.

It is furthermore advantageously provided that at least during the positioning movement of the cutting tool over the retaining device positioned in the starting tube, an air stream is supplied. A cooling from the interior thereby results. Simultaneously, directly on parting the wall thickness, the chip produced can be led away outward, so that the parting place is free from chips and damage to the cut places of the starting tube and the tube piece does not occur.

The device according to the invention has the advantage that a compact and space-saving arrangement is provided, in which the retaining device is provided in the starting tube and a processing of the end sections, of the outer tube and of the tube pieces, is made possible with high quality. With the support of the cut place with a support section engaging on the starting tube, and a clamping device engaging on the tube piece, it is made possible that a cutting-out process is performed with a high advance of the cutting tool. At the same time, the pressure loadings during the cutting process are reliably taken up due to the support arranged directly adjacent to the cut place, so that the process safety during the forwarding of the cutting tool is increased and the process duration is reduced.

According to a further advantageous embodiment of the device, it is provided that the clamping device is displaceable in the axial direction relative to the retaining device. It is thereby made possible that the cutting and deburring tools are arranged in a stationary position and the starting tube is provided for production of a new tube piece by the following-up of the starting tube by means of the clamping device. Thus, for example, the tools can be provided on a rigid, vibration-free machine frame, so that the processing quality is further increased. The component cost is simultaneously reduced.

It can alternatively be provided that the tools are provided to be able to travel at least slightly relatively to the cut place. Thereby, for example, on introducing the deburring tool into the interior of the starting tube, a positioning movement of the starting tube or of the tube piece is omitted.

The starting tube, the tube piece and at least the deburring tool can advantageously be made movable relative to the cut place. This embodiment has a maximum of flexibility, in order to perform a deburring of the mutually facing end faces, or respectively cut faces, after the production of the tube piece.

According to a further advantageous embodiment of the device, it is provided that a support section is arranged in a working position on a guide tube of the retaining device, and is preferably interchangeable to match different diameters. The support section can be formed as a push-on ring or split ring. By the interchangeable arrangement of the support section, a rapid changeover can be given of equipment to different internal tube diameters to be processed. The support section is advantageously also provided on the clamping device.

According to a further advantageous embodiment of the invention, it is provided that the clamping device of the tube piece is positioned on a guide tube of the retaining device, which includes effective elements for actuating the clamping device for enlarging the outer periphery. An arrangement located inward is thus provided, thus inward of the tube piece, making possible a compact construction and direct action near the cut place.

According to a further advantageous embodiment of the device, it is provided that a tie rod engages on the guide tube and in a closed position acts on a wedge drive of the guide tube, and fixes clamp jaws in a clamping position to the tube piece. In a simple manner a takeup can t hereby be made possible of the tube piece, which like the starting tube is arranged to be rotatable after the cut has been made.

According to an alternative embodiment of the device, it is provided that the guide tube actuates a cam disk with a cam which moves the clamp jaws into a clamping position. The cam disk advantageously has cams which engage on segments in a bushing section and move these radially outward.

According to a further alternative embodiment of the clamping device, it is provided that a pressure piston is guided in the guide tube or a pressure duct is provided which introduces a pressure medium into chambers in the clamping device. This alternative drive form for positioning the clamping device in a clamping position is likewise suitable for driving the tube piece rotatably.

The pressure medium is advantageously provided as a hydraulic or pneumatic medium. For example, a membrane can be provided into which a pressure medium is filled. This membrane expands so that individual segments of the clamping device are moved over into the clamping position.

According to a further advantageous embodiment, the clamping device is such that a tie rod is provided in the guide tube and actuates a lever mechanism for bringing clamp jaws or clamp elements into a clamping position. This embodiment represents a further mechanical solution, which can likewise be used for rotational drive of the retaining element.

It is preferably provided that an equalizing element is interchangeably received on a support section of the clamping element. An exact match to an internal diameter of the tube piece to be processed can thus be effected. A housing of the clamping device has a predetermined external diameter. The adjustment path or stroke of the clamping segments is for example 2 mm in diameter as against the housing diameter. The tolerances of an internal diameter of the tube piece to be processed can be bridged over by the clamping segments, in order to make a stress possible. An optimum abutment of the tube piece is thereby given near the processing place or cut place, and corresponding to the internal diameter of the tube piece an equalizing segment is installed on a support section which is allocated to the processing place. The abutment conditions left and right of the cut place are thereby nearly equal or equal, so that a cleaner cut and a uniform internal and external deburring of the tube piece are made possible.

The equalizing element is advantageously set as an equalizing ring, in order to form a centered receiver for the support element. A centering applied to the equalization ring, formed as an annular joint, makes possible an improved reception of the tube piece. The roundness is thereby improved and an improved processing quality is attained.

According to a further advantageous embodiment of the device, it is provided that a support ring is interchangeably provided on an ejector, or that an equalizing element is interchangeably provided on the support ring. Thus the support ring arranged on the ejector can likewise be matched to an exact internal diameter of the tube piece to be processed, so that a uniform reception of the end section of the tube piece on the support ring of the ejector is given. The interchangeable support ring or an interchangeable equalizing element arranged thereon likewise have, analogously to the equalizing element on the support section, likewise have an external diameter stepped in a few tenths of a millimeter, in order to make optimum fitting possible.

The invention and also further advantageous embodiments and developments of the same are described and explained in detail hereinafter using the embodiment shown in the drawing. The features to be gathered from the description and the drawing can according to the invention be applied individually per se or together in optional combination.

BRIEF DESCRIPTION OF THE DRAWINGS

FIG. 9 shows a schematic side view of the retaining device according to FIG. 8a, and FIGS. 10-13 are schematic sectional diagrams of alternative embodiments to FIG. 8a.

DETAILED DESCRIPTION OF THE INVENTION

Figure 1:
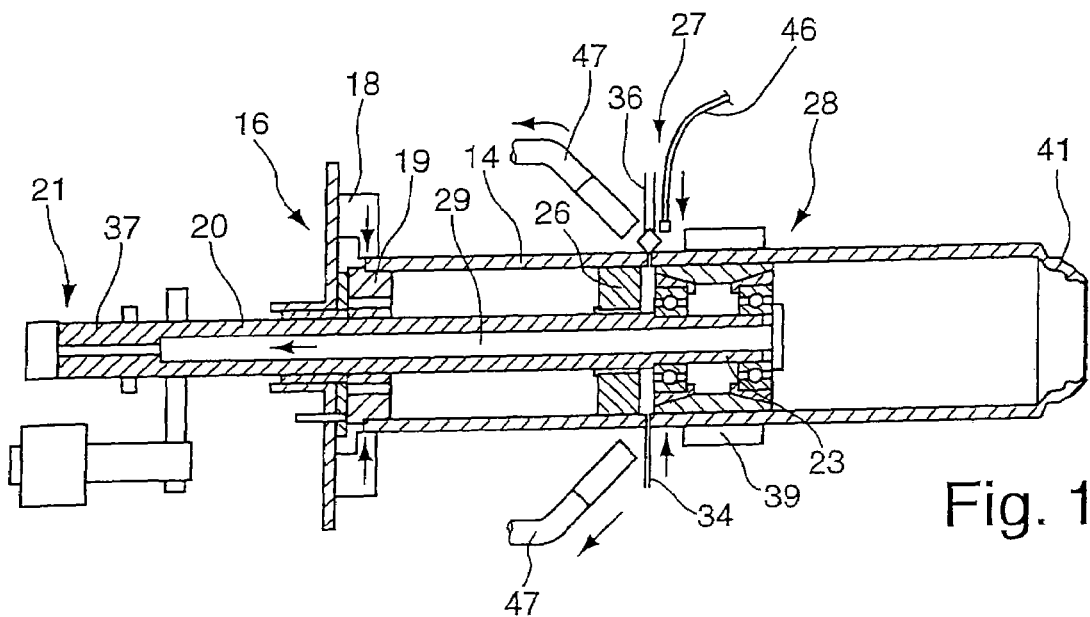
FIGS. 1-6 are schematic diagrams of individual process steps for cutting and deburring a tube piece.

An excerpt of a device 11 for cutting and deburring tubes 12 is shown in FIG. 1. The device 11 can preferably be equipped with a preferably automatic supply station by means of which starting tubes 14 of large length, for example 2-7 m, are prepared. The starting tube 14, for producing tube pieces 12, is received before a clamping device 16 and a retaining device 17. The clamping device 16 comprises, for example, a three-jaw clamp 18, by means of which the starting tube 14 is fixed to a support ring 19. The three-jaw clamp 18 and the support ring 19 are rotatably driven by a drive unit 21. The support ring 19 can be matched to the diameter of the starting tube 14 to be processed, or support rings 19 of different diameter can be used.

The support ring 19 is positioned on a retaining tube 20 which receives the retaining device 17. This retaining device 17 comprises a support section 26 which is arranged on the retaining device 17 and is allocated to a cut place 27. Adjacent to the cut place 27 and opposite the support section 26, a clamping device 28 is provided, which is actuated by a tie rod 29 and is received by a guide tube 23. The tie rod 29 is axially displaceably guided in the guide tube 23. The clamping device 28 has a wedge drive 31 in the embodiment example of FIG. 1, which on actuating the tie rod effects the radial outward movement of the clamping jaws or segments 32, whereby the clamping device is moved into a clamping position for the starting tube 14.

The cut place 27 for a cutting tool 34 and a deburring tool 36 is provided between the support section 26 and the clamping device 28. The distance remaining between the support section 26 and the clamping device 28 is minimized such that the cutting tool 34 and the deburring tool 36 can execute the individual processing steps unhindered, and sufficient support is given for the starting tube 14 and the tube piece 12.

The tie rod 29 can for example be actuated by a pneumatic or hydraulic cylinder 37 of the drive unit 21. Alternatively, an electrical, electromagnetic or mechanical drive can be provided, which preferably drives a spindle in order to perform the feed motion of the tie rod 29. The retaining tube 20 surrounding the tie rod 29 is likewise rotatably driven by the drive unit 21. The drive connection between the drive unit 21 and the three-jaw clamp 18 is of the usual kind.

For correctly positioning the retaining device 17 to the cut place 27, a bearing 39 is provided which engages on the outer periphery of the starting tube 14 and/or of the tube piece 12 and positions the retaining device 17 coaxially of the clamping device 16. This bearing 38 can be provided by rollers, by a channel, preferably a V-shaped channel with a slide coating, or brushes in the form of a channel, or the like. This bearing 38 makes it possible for the starting tube 14 to be processed with a length of several meters.

A processing cycle for producing tube pieces 12 from a starting tube 12 is shown in FIGS. 1-6 and is described in detail hereinafter.

The starting tube 14 is for example made of plastic. Alternatively also cardboard tubes, metal tubes, or other tubes can be processed. The starting tube consisting of plastic in the embodiment example has a sprue 41. The first processing cycle acts to remove the sprue 41 and to produce an inner and outer bevel 42, 43 on a cut edge 44.

The starting tube 14 is set in rotation by means of the drive unit 21. Following this is a cutting tool 34 which preferably is a cutting-off blade with a freely selectable and predetermined advance movement to the starting tube 14. The starting tube 14 is processed by chip-forming processing. During the chip-forming processing, a coolant or lubricant is supplied via a supply duct 46 to cool the cutting tool 34 and the cut place 27. Likewise a lubrication, preferably a minimum-amount lubrication, can be provided, for example from outside onto the cutting tool 34.

Figure 2:
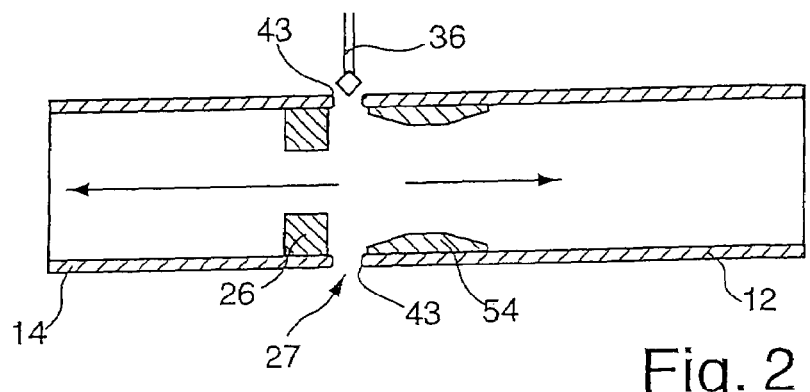
Figure 3:
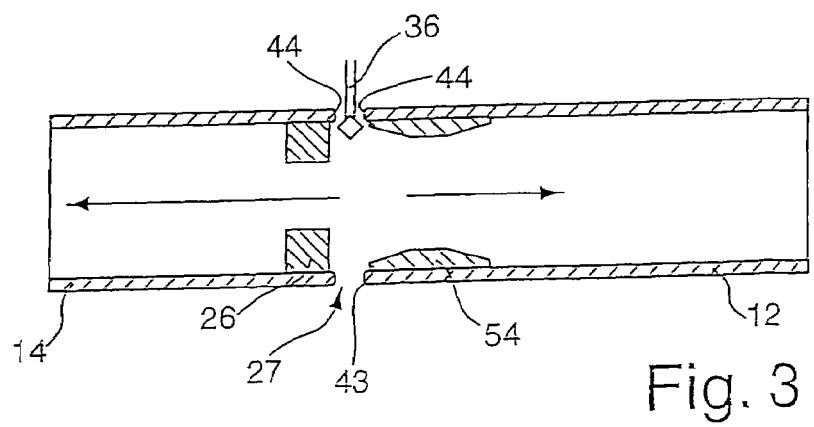
Figure 4:
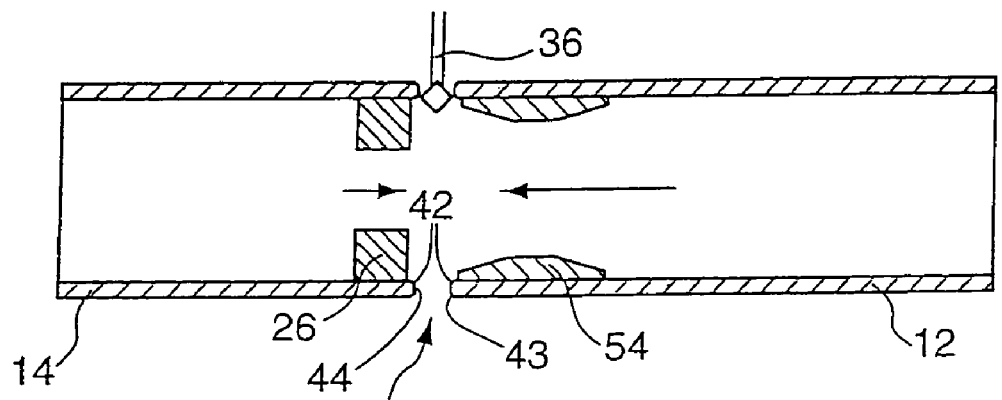

The deburring tool 36 is preferably provided opposite the cutting tool 34. After insertion of the cutting tool 34 there takes place a feed of the deburring tool 36. A supply duct 46 is likewise allocated to the deburring tool 36 and supplies a coolant and/or lubricant. A suction duct 47 is preferably provided for removing the chips. The deburring of a cut edge 44 formed on the outer periphery is preferably performed simultaneously with the production of the cut. The cutting tool 34 is returned to its initial position. Thereafter the starting tube 14 and the tube piece 12 with sprue 41 are moved relatively apart from one another, as shown by FIG. 2. The movement apart is adapted to the size of the deburring tool 36. According to the embodiment example, the same amount of movement of the starting tube 14 and the tube piece 12 takes place. After a sufficiently large gap for introducing the deburring tube is present, the deburring tool 36 is inserted according to FIG. 3 into the interior of the starting tube 14 and of the tube piece 12, Following on this, as shown in FIG. 4, the starting tube 14 and the tube piece 12 are moved into a deburring position, so that an inner bevel 42 is produced simultaneously on the starting tube 14 and on the tube piece 12.

Alternatively, it can be provided that the starting tube 14 is first moved into the deburring position, to produce an inner bevel. The analog holds for the tube piece 12, so that after producing the inner bevel on the starting tube 14 this is moved out of the deburring position, in order thereafter to process the tube piece 12.

Figure 5:
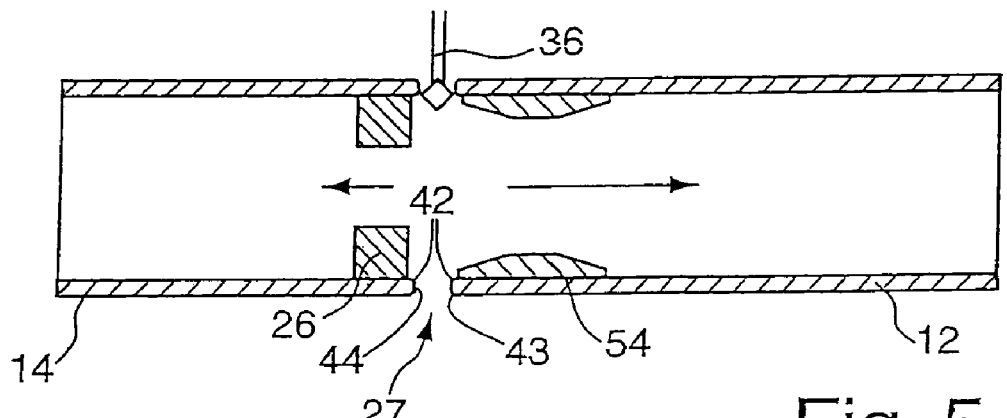
Figure 6:
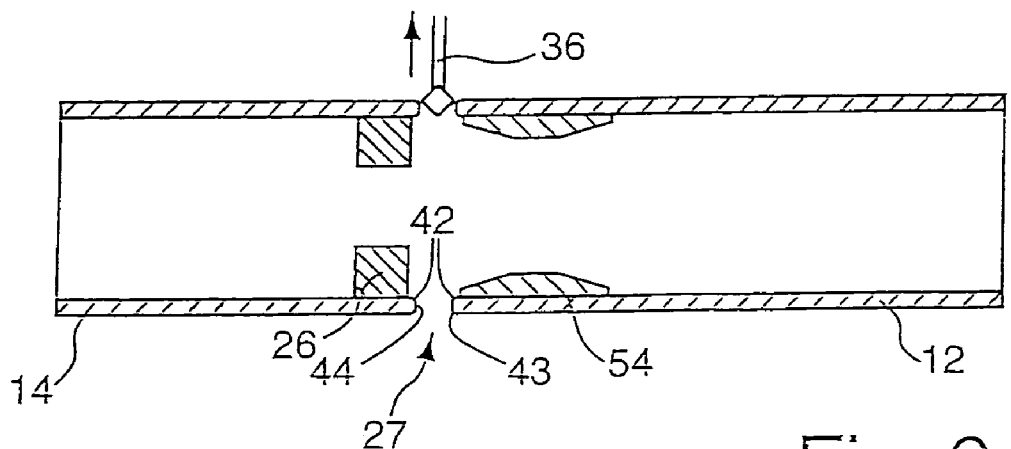

After production of the inner bevel 42, according to FIG. 5 the starting tube 14 and the tube piece 12 are moved out of the deburring position and into a further processing position, in which the end faces 49 of the starting tube 14 and of the tube piece 12 are processed.

During the outward movement of the deburring tool 36 from the interior of the starting tube 14 and of the tube piece 12, the end faces 49 are processed. This is for example shown in FIG. 6. The starting tube 14 and the tube piece 12 are shown in a position in which the end faces 49 are processed simultaneously. Alternatively it can again be provided that first one of the two end faces 49 of the starting tube 14 and the tube piece 12 is processed.

Preferably a smoothing is performed in order to attain high surface quality. After the end face 49 has been produced, the deburring tool 36 is moved back to the initial position. The clamping device 28 is moved over from a clamping position into an inoperative position, so that the tube piece 12 becomes free. By positioning or subsequent pushing the starting tube 14 into a new position for producing the tube piece 12, the cut tube piece 12 with sprue 41 is stripped or ejected from the clamping device 17. In the first processing cycle the tube piece 12 with sprue 41 is sorted out as waste.

The first processing cycle is likewise completely performed, since the end face 49 on the starting tube represents an end face of the tube piece 12 in the next processing cycle and thus already in this first processing cycle a first end face 49 of a tube piece 12 is produced with an inner and outer bevel 42, 43.

For performing the next following process cycle, the clamping device 16 is moved axially toward the clamping device 28. The length of he tube piece 12 is set and determined by the length of the displacement path. Following thereafter, the clamping device 28 is actuated and moved over into a clamping position, and the previously described working cycle begins anew.

Figure 7A:
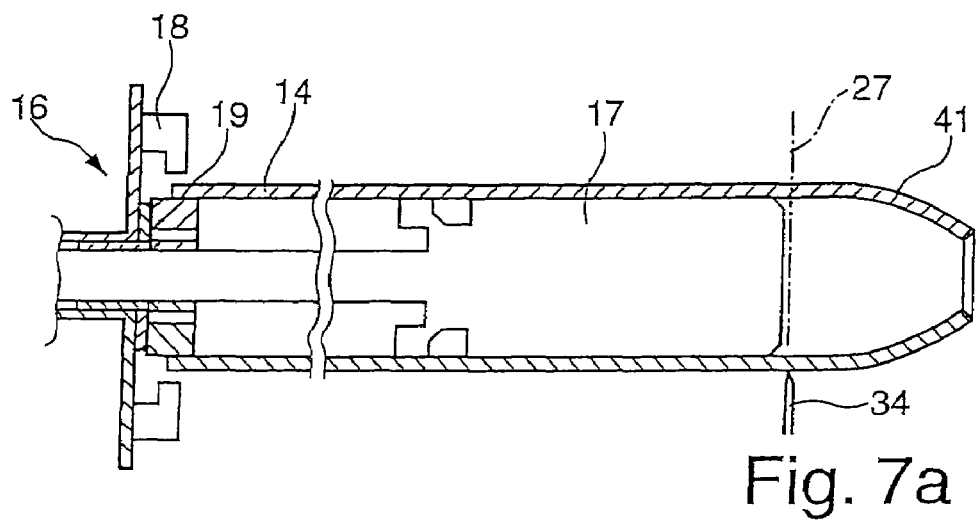
FIGS. 7a-7c show schematic diagrams of individual alternative process steps for a first processing cycle.
Figure 7B:
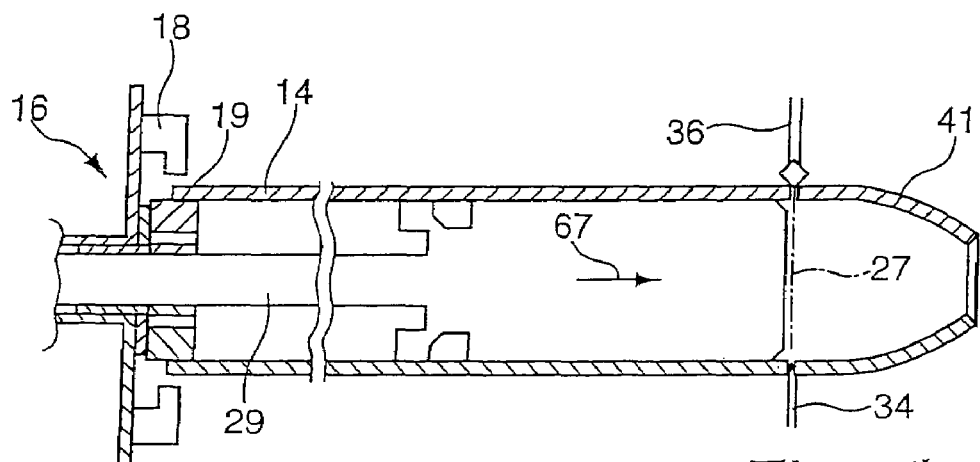
Figure 7C:
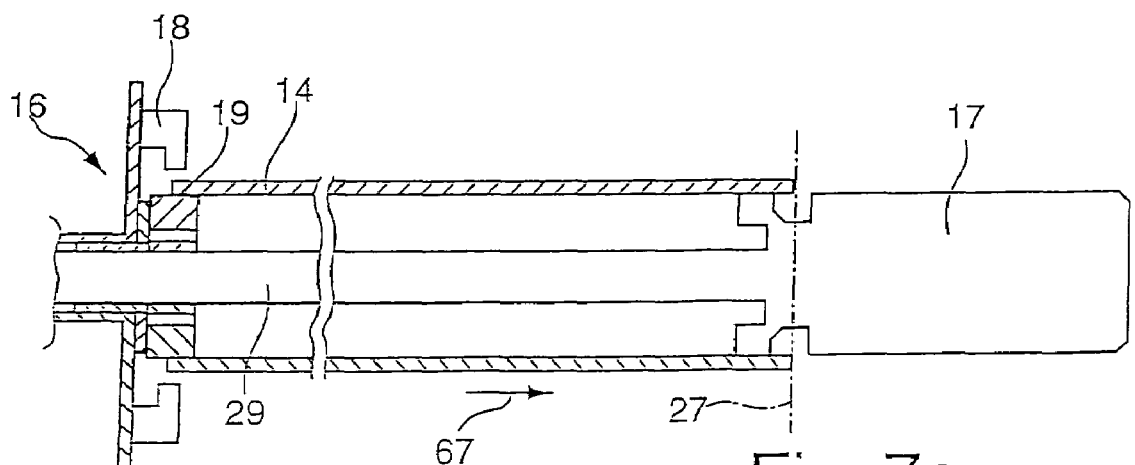

An alternative process course is shown in FIGS. 7a-7c for a first processing cycle. This first processing cycle and also and also the processing cycle described for FIGS. 1-6 is always required when a sprue 41 is provided on a starting tube 14.

The starting tube 14 is set on the clamping device 16 and the retaining device 17. The three-jaw clamp 18 fixes an end of the starting tube 14 to the support ring 19. The retaining device 17 is brought by a tie rod 29 into a first position in which the retaining device 17 in the embodiment example is positioned to the left of the cut place 27. The starting tube 14 is set in rotation and a cutting tool 34 processes the starting tube 14, so that a sprue 41 is parted from the starting tube 14. This is shown in FIG. 7b. Thereafter the retaining device 17 is moved to the right according to the arrow 67 so as to move to a position shown in FIG. 7c. In this position the first free end of the starting tube 14 is arranged to a depression 88 of the retaining device 17. In this position this first free end is processed by the deburring tool 36, so that an inner bevel 42, an outer bevel 43 and also an end face 49 are present with high quality. Thereafter the clamping device 16 moves to the cut place 27, so that the starting tube 14 covers the retaining device 17 at least partially or completely. Depending on the width of the tube piece 12 to be produced, the sliding movement of the clamping device 16 takes place in the direction toward the cut place 27. The retaining device 17 is then actuated, so that the clamping device 28 engages the starting tube 14 from within, in order to perform the next processing cycle for producing a first tube piece 12.

With tubes which are ready for processing without a sprue 41, a first working cycle according to FIGS. 1-6 or FIGS. 7a-7c can likewise be performed, and also a first processing cycle which begins, for example, in a position according to FIG. 7c. The end processing of the first free end of the starting tube 14 can be provided directly, or a slight processing of the starting tube 14 can first be performed with the cutting tool, in order thereafter to produce the desired end state with the deburring tool.

Figure 8A:
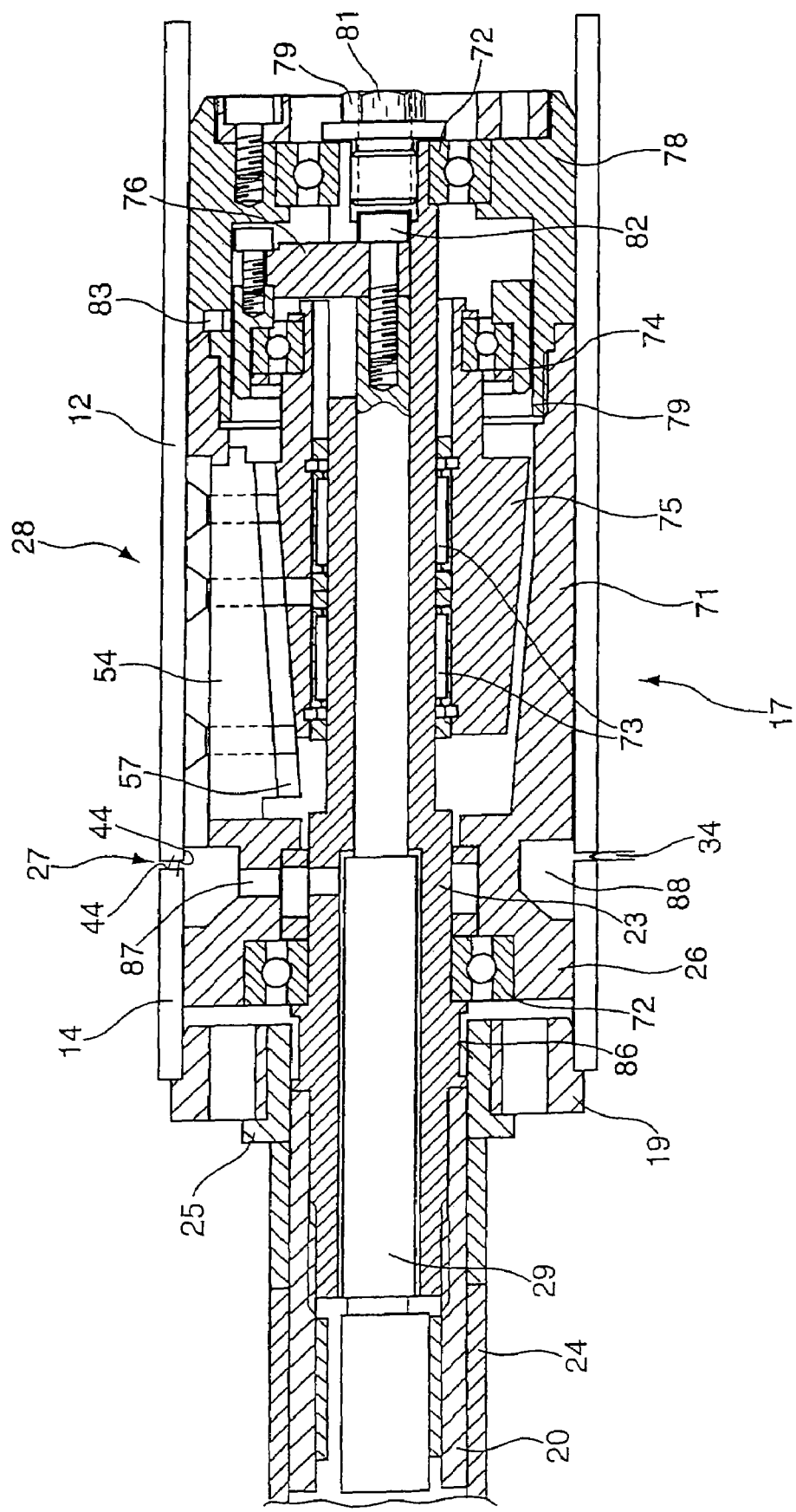
FIG. 8a shows a schematic full cross section of the retaining device.

A schematic full cross section of a retaining device 17 is shown in FIG. 8a. FIG. 9 shows a side view of the retaining device 17 according to FIG. 8, from the right-hand side. The retaining device 17 is releasably fastened by means of a guide tube 23 to a retaining tube 20, preferably by a screw thread. A rapid and simple change of the retaining device 17 to a different diameter of the starting tube 14 to be cut can thereby be given. The retaining tube 20 is surrounded by an ejector 24. This ejector 24 is positioned axially displaceably with respect to the retaining tube 20. The ejector 24 engages, at an end allocated to the retaining device 17, on a bushing 25, which is preferably formed as a sinter bushing. This bushing 25 receives the support ring 19. In order to eject the residual piece of the starting tube, it is provided that the ejector 24 is moved over into a position near the cut place 27, so that a simple and rapid stripping of a residual starting tube 14 is made possible. In FIG. 8, the starting tube includes a short residual piece which is fixed to the support ring 19 and is supported on the support section 26. The support section 26 is a portion of a housing 71 which receives the clamping device 28. The housing 71 is received, by means of a bearing 72, rotatably with respect to the guide tube. Wedge-shaped bushing sections or a bushing 75 are positioned on the guide tube 23 and are arranged rotatably and axially displaceably, for example by means of needle bearings 73, on the guide tube 23. The clamp jaws 54 are connected to the tie rod 29 by means of a shaft connection 74 with a star-shaped retaining section 76, so that the wedge-shaped bushing 75 is displaceable axially of the guide tube 23. By actuation of the tie rod 29, the wedge-shaped bushing 75 moves toward the left, so that the clamp jaws 54 are moved radially outward. It can alternatively be provided that the clamp jaws perform a pivoting motion. According to the embodiment example, it is provided that the clamp jaws 54 are guided in T-shaped grooves 77, which are arranged running obliquely. A uniform force transfer from the wedge-shaped bushing 75 via the clamp jaws 54 to the tube piece 12 can thereby be given. Other embodiments of wedge drives which make possible a clamping movement of the clamp jaws 54 can likewise be used.

The housing 71 is formed in two parts and has an end section 78 which is fastened to the guide tube 23 via a screw connection 79 by means of the shaft bearing 72. The screw connection 79 is for example formed as a hexagonal nut with an internal bore 81 in order to engage on a fastening means 83 which fixes the star-shaped retaining element 76 to the tie rod 29 and effects the clamping movement of the wedge-shaped bushing 75. The end section 78 of the housing 71 is fixed to the forward section by a screw connection, a safety screw 83 being installed for rotation securement.

To change the retaining device 17, a key place 86 is provided on the guide tube 23 in order to release the guide tube 23 from the retaining tube 20. The guide tube 23 has, up to the cut place 27, an internal diameter which is enlarged with respect to the tie rod 29, in order thereby to make possible a supply of a coolant and/or lubricant via a supply aperture 87 to the cut place 27. The retaining device 17 has a depression 88 which runs around and forms a free space so that the deburring tool 36 makes possible the production of an inner bevel 42 on the starting tube 14 and the tube piece 12 without damaging the clamping device 17.

Figure 8B:
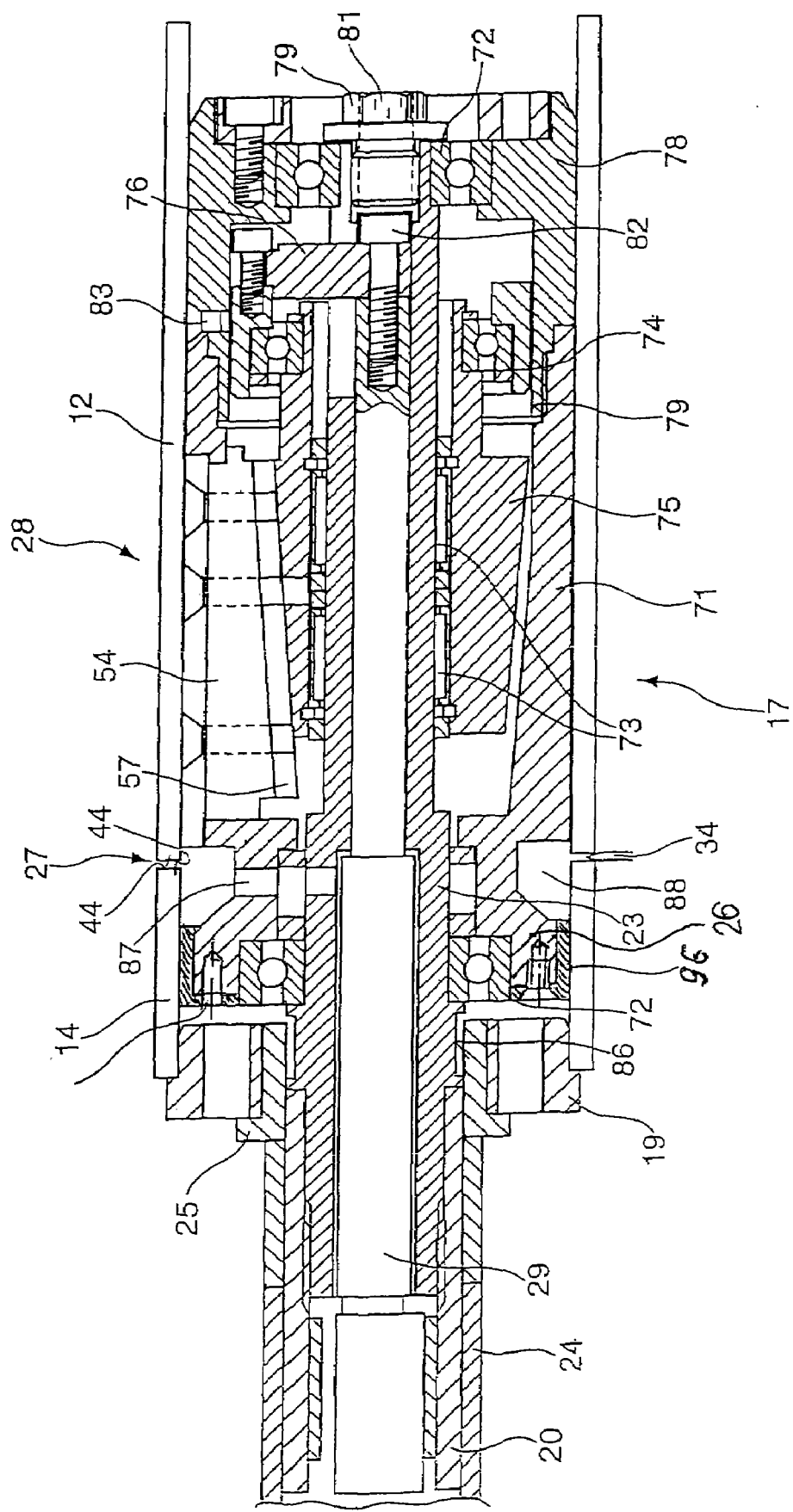
FIG. 8b shows a schematic sectional diagram of an alternative retaining device according to the invention.
Figure 9:
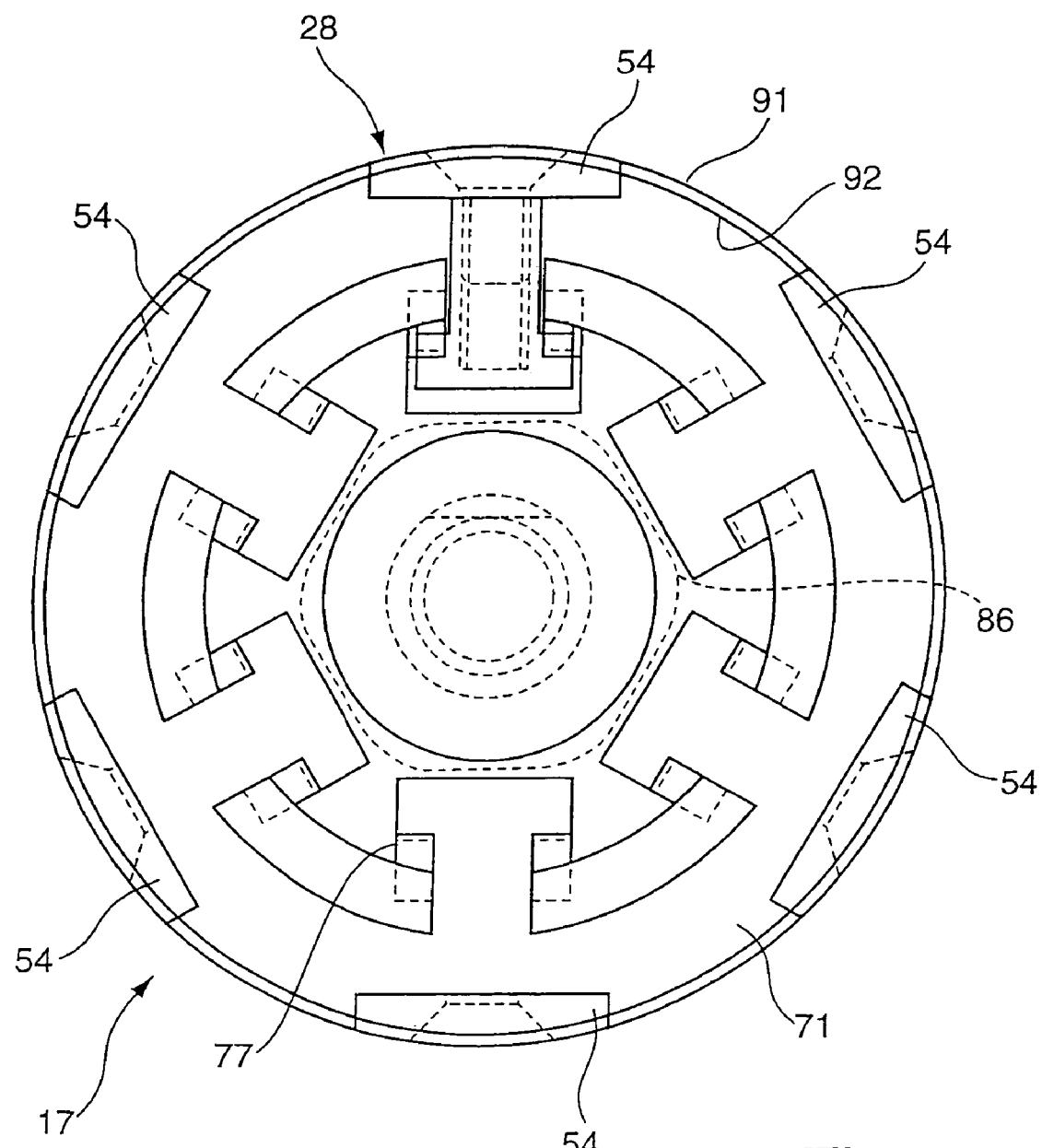

An alternative form of the retaining device according to the invention according to FIG. 8a is shown in FIG. 8b. This embodiment differs from that in FIG. 8a in that the support section 26 receives an equalizing element 96 and the support ring 19 is interchangeably provided on the bushing 25. An external diameter of the equalizing element 96 and of the support ring 19 is adapted to an internal diameter of a tube piece to be processed or is determined with respect thereto. For optimum abutment and receiving of the tube piece in this region, the equalizing element 96 and support ring 19 are provided for example with a stepping in external diameter for example of 0.1 or 0.2 mm or the like. An equalization to the tolerance of the clamping device 28 can thereby be given, which for example is suitable for bridging over a tolerance of 2 mm. In particular with thin-walled tubes, having small stiffness, the use of the equalizing element 96 confers the advantage that nearly equal receiving conditions are given left and right of the cut place, so that a good support is given of the end regions adjoining the cut edge 44.

The equalizing ring 96 is for example releasably provided by screwing to the support section 26. The peripheral wall thickness is processed exactly to measurement. It is evident from an indication on the annular joint which provision in the stepping is given with respect to the external diameter if the housing 71, in order to equip the clamping device 28 corresponding to the next following processing.

The analog holds for the support ring 19. It can alternatively be provided that the support ring 19, analogously to the support section 26, is an equalizing element 96.

In FIG. 9, the clamping device 28 is shown in a relaxed position. In FIG. 8a, the clamp jaws 54 are shown in a clamping position. These have an enlarged outer periphery 91 with respect to the outer periphery 92 of the housing 71.

In the following FIGS. 10-13, further alternative embodiments of the retaining device 17 to FIGS. 8a, 8b and 9 are shown.

Figure 10:
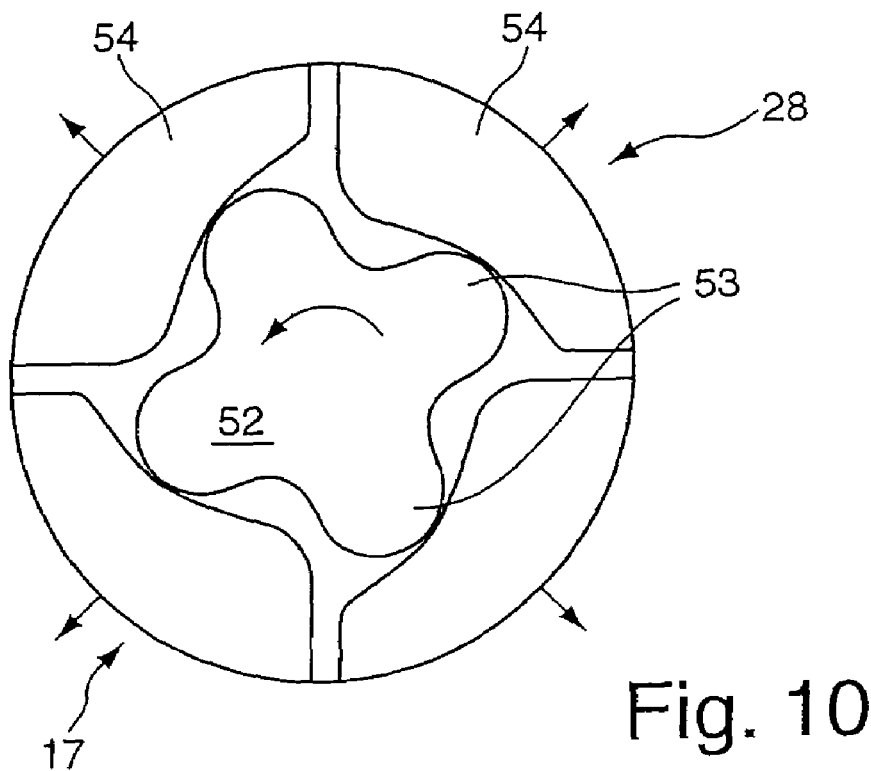

In FIG. 10, a further mechanical actuating arrangement is shown, in order to embody the clamping device 28. The tie rod has at its front end a cam disk 52 which comprises one or more cams 53. Upon actuation of the tie rod, the cam disk 52 is rotationally driven, in order to move radially outward the clamp jaws or segments 54 allocated to the cam 53. The external periphery is thereby increased and a clamping position to the tube piece 12 is attained. To release the clamp position, the cam disk 52 is set back in the opposite direction. By means of this embodiment, a very narrow clamping device 17 can be formed, so that very narrow tube pieces 12 can be produced.

Figure 11:
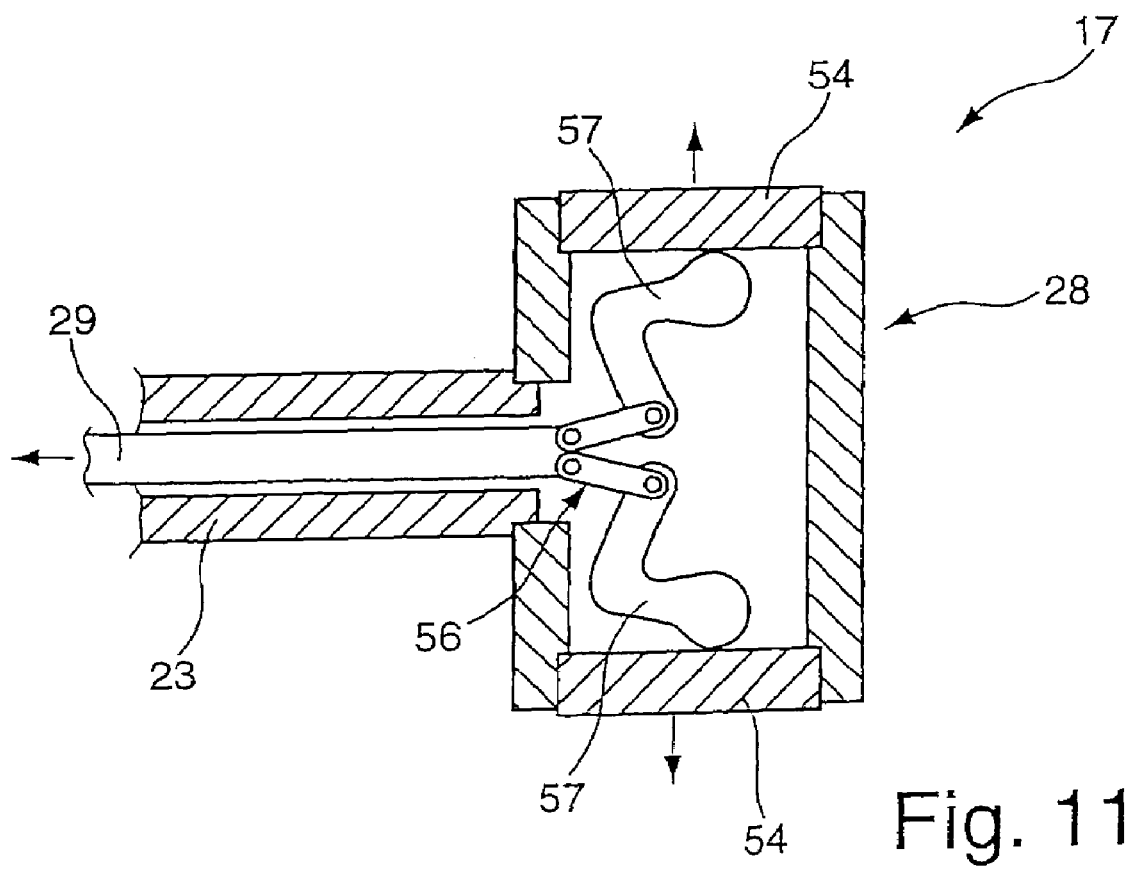

In FIG. 11, a further alternative mechanical arrangement of a clamping device 28 is shown. The tie rod 29 has at the end facing the clamping device 28 a lever mechanism 56 which causes the lever 57 to move outward when there is a positioning movement of the tie rod 29 and to act on the clamp jaws of the segments 54, whereby the clamping position of the retaining device 17 is reached.

Alternatively to the mechanical solutions, electrical or electromagnetic clamping devices 28 can be constituted. For example, piezoelectric positioning elements or electromagnetic positioning elements can be provided.

A further alternative embodiment of the clamping device 28 is shown in FIG. 28. The clamping action is attained by means of a pressure medium, for example. The pressure in a chamber 62 is increased by actuation of a piston 61, moving segments 54 outward. The segments 54 are thereby moved over into a clamping position. This piston 61 can be positioned Immediately in the region of the clamping device 28 or near the drive unit 21, in order for example to reduce the rotating masses. Air, oil, water, a gel-like liquid, or the like can be provided.

Figure 12:
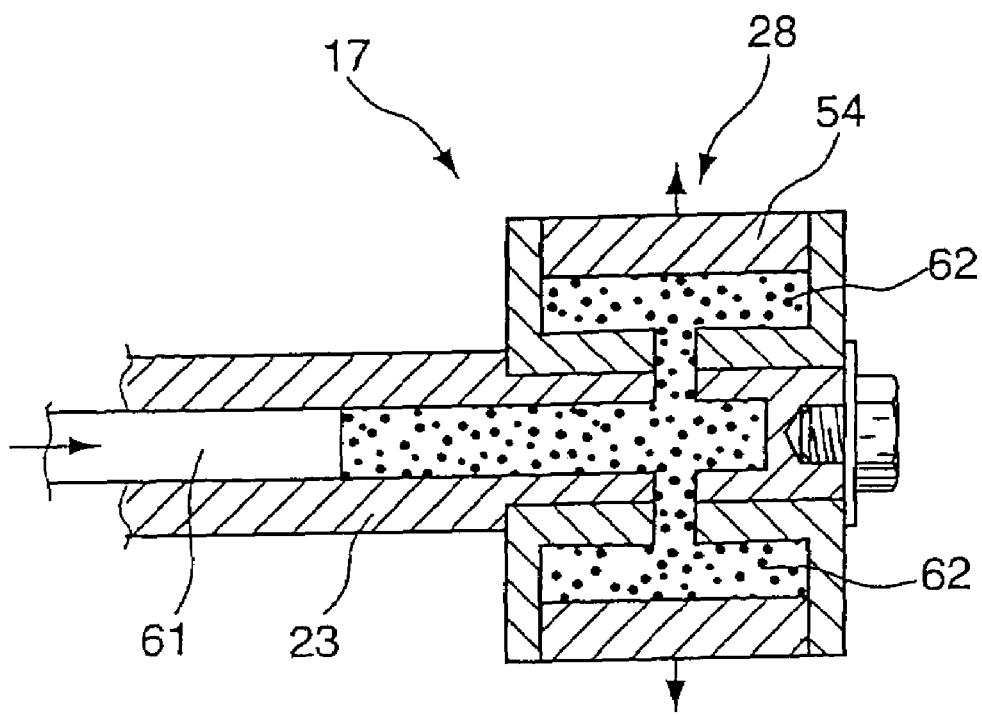
Figure 13:
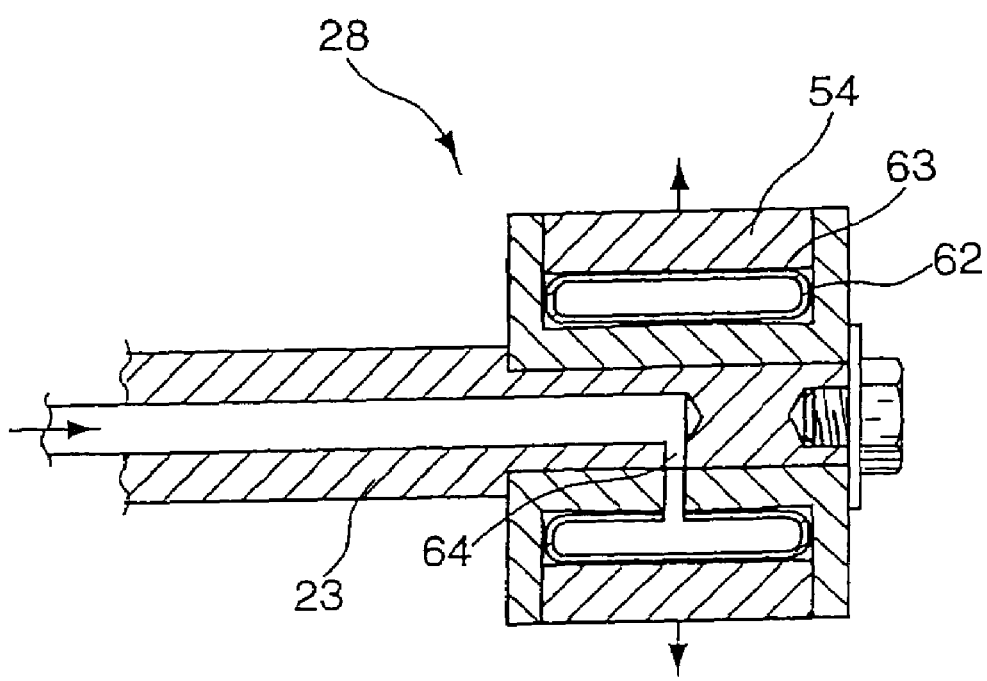

A further alternative embodiment to FIG. 12 is shown in FIG. 13. The chamber 62 is formed as a revolving chamber and receives a membrane 63 or a flexible tube which are supplied with a pressure medium via a connection 64. When acted on by pressure, the segments 54 are moved radially outward, in order to attain a clamping action.

The segments 54 can include a surface with high roughness, or a knurled or ribbed surface, for reliable transfer of rotation forces, a greater surface adhesion to the tube piece 12 being attained. Adhesion-improving surfaces or surface materials can likewise be installed.

The invention claimed is:

1. Method for cutting and deburring tubes, wherein a starting tube (14) is successively cut into numerous small tube pieces (12) and thereafter deburred in the same clamping, in which the starting tube (14) is positioned on a clamping device (16) and a retaining device (17 arranged thereto and is fixed by means of the clamping device (16) and retaining device (17) by clamping, in which a cutting tool (34) is supplied to a cut place (27) and a tube piece (12) is parted from the starting tube (14), and wherein a deburring tool (36) is supplied to the cut place (27) and cut edges (44) are deburred at the outer periphery of the starting tube (14) and the tube piece (12); and wherein the starting tube (14) or tube piece (12) or the starting tube (14) and the tube piece (12) are moved apart from one another relative to the cut place (27); and wherein the deburring tool (36) is introduced into an interior of the starting tube (14) and of the tube piece (12); and wherein the starting tube (14) or the tube piece (12) or the starting tube (14) and the tube piece (12) are moved into a deburring position to the deburring tool (36) and the cut edges (44) at the inner periphery of the starting tube (14) and the inner tube (12) are deburred; and wherein the starting tube (14) or the tube piece (12) or the starting tube (14) and the tube piece (12) are moved out of the deburring position; and wherein the deburring tool (36) is moved back into a starting position.

2. Method according to claim 1, wherein the deburring tool (36) is supplied in advance, after, or simultaneously with the cutting tool (36) to the cut place (27) for processing an outer cut edge (44).

3. Method according to claim 1, wherein a fine processing is performed after the deburring of the inner cut edge (44) at end faces (49) of the tube piece (12) and of the starting tube (14).

4. Method according to claim 3, wherein the end face (49) of the tube piece (12) and of the starting tube (14) are successively or simultaneously passed through into a fine processing position by positioning the starting tube (14) or the tube piece (12) or the starting tube (14) and the tube piece (12).

5. Method according to claim 1, wherein the starting tube (14) is set in rotation during the cutting off of a tube piece (12).

6. Method according to claim 1, wherein the starting tube (14) and the tube piece (12) are set in rotation during a deburring of the cut edges (44).

7. Method according to claim 1, wherein the starting tube (14) and the tube piece (12) are set in rotation during a fine processing.

8. Method according to claim 1, wherein the starting tube (14) and the tube piece (12) are set in rotation, running alike.

9. Method according to claim 1, wherein a coolant or lubricant is supplied to the cut place (27) during the cutting off of a tube piece (12).

10. Method according to claim 1, wherein the retaining device (17), which is positioned within the starting tube (14), is set in rotation by a drive unit (21).

11. Method according to claim 1, wherein the retaining device (17) and the starting tube (14) are driven by a common drive unit.

12. Method according to claim 1, wherein the retaining device (17), which receives the cut-off tube piece (12), is positioned coaxially of the clamping device (16) by a bearing (39) engaging on the outer periphery of the tube piece (12).

13. Method according to claim 1, wherein an air stream is supplied to the cut place (27) via the retaining device (17) arranged within the interior of the tube piece (12) and of the starting tube (14).

* * * * *